United States Patent Office 3,322,779
Patented May 30, 1967

3,322,779
DI- AND TRIPHENYLLEAD SULFIDES HAVING SUBSTITUENT RADICALS JOINED TO THE SULFUR ATOM
Malcolm C. Henry, Harvard, Mass., and Adolf W. Krebs, New York, N.Y., assignors, by direct and mesne assignments, to International Lead Zinc Research Organization, Inc., New York, N.Y., a membership corporation of New York
No Drawing. Filed Apr. 1, 1963, Ser. No. 269,771
1 Claim. (Cl. 260—299)

Our present invention relates to new organolead compounds containing sulfur, and more particularly to substituted tetra-valent lead compounds in which the substituent groups attached to the lead atom are phenyl radicals (either 2 or 3) and in which the groups attached to the sulfur atom, and through the sulfur atom to the lead atom, are aliphatic, or aromatic.

Further our invention relates to novel methods of making these compounds. The new compounds have been found to have valuable properties, as will be pointed out below.

In general, our new compounds are phenyllead sulfides represented by the formula $$Ph_nPb(SR)_{4-n}$$

where Ph is a phenyl group, and R is a radical selected from the aliphatic or aromatic groups, and $n$ is either 2 or 3.

In general, the reaction which we have discovered for producing these compounds may be represented as follows:

$$(n-1)Ph_nPbCl_{4-n} + Pb(SR)_2$$
$$\rightarrow (n-1)Ph_nPb(SR)_{4-n} + PbCl_2$$

The compounds $Pb(SR)_2$ may first be formed by the known reaction $$2RSH + Pb(OAc)_2 \rightarrow Pb(SR)_2 + 2HOAc$$

Thus two molar equivalents of the respective mercaptan or thioacid dissolved in alcohol were dropped slowly into a refluxing 50% alcoholic solution containing one molar equivalent of lead (II) acetate. An almost immediate precipitation of the yellow lead (II) mercaptide or lead (II) salt of the thioacid takes place.

EXAMPLE 1

(a) *The preparation of thiomethyl triphenyllead*

Stoichiometric amounts of triphenyllead chloride and lead (II) methyl mercaptide were refluxed in benzene for three hours. During this time the lead (II) methyl mercaptide was converted into white lead (II) chloride.

$$2(C_6H_5)_3PbCl + Pb(SCH_3)_2$$
$$\rightarrow 2(C_6H_5)_3PbSCH_3 + PbCl_2$$

The lead chloride was filtered off, the benzene evaporated, and the remaining residue of $(C_6H_5)_3PbSCH_3$, melting point 106–108° (yield: quantitative) recrystallized from hexane; M.P. of pure compound 108–109°. Mixed melting points with admixture of a known sample gave no depression.

By starting with the corresponding lead (II) ethyl mercaptide, the compound thioethyl triphenyllead may be prepared following the procedure of Example 1(a).

(b) *The preparation of thio n-propyl triphenyllead* n-Propyl lead (II) mercaptide was first prepared as given above, i.e., from stoichiometric amounts of the corresponding thiol and lead acetate in 50% aqueous alcohol, and after washing the so-formed salt with water, it was dried in a vacuum desiccator.

Triphenyllead chloride, 4.86 g. (10 mmoles), and lead (II) n-propyl mercaptide, 1.79 g. (5 mmoles), in 100 ml. benzene were refluxed with stirring for three hours. During this time the yellow mercaptide was converted into white insoluble lead chloride which was filtered off at the end of the reaction period. The filtrate was evaporated and the residue recrystallized from ethanol, yield 4.84 g. (95%). M.P. 57–58°.

The above described new compounds are white, or slightly colored crystalline compounds, with the exception of the liquid butyl and decyl compounds. The former, the solid compounds, decompose above the melting point to a dark brown material. The liquid compounds decompose at their boiling point. All are readily soluble in benzene, n-hexane, alcohol, chloroform, and most of the other common organic solvents. The infrared absorption spectra of all compounds show, besides the usual absorptions associated with aromatic compounds and the respective group attached to the sulfur, the band at 1052 cm.$^{-1}$, typical for organolead compounds.

Methyl iodide reacted quantitatively at room temperature with thiomethyl triphenyllead to yield triphenyllead iodide and dimethyl sulfide, probably through an unstable sulfonium salt intermediate:

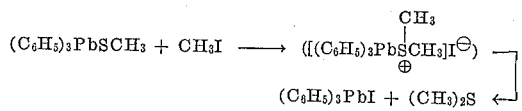

This reaction did not take place with triphenyllead thioacetate; apparently the acetyl group decreases the electron density at the sulfur atom so that formation of a sulfonium intermediate becomes impossible.

Mineral acids cleaved the lead-sulfur bond preferentially; however, cleavage of lead-phenyl bonds was always detected. For example, mixtures of triphenyllead chloride, diphenyllead dichloride and lead chloride were obtained from the reaction of thioalkyl triphenyllead compounds and hydrochloric acid.

EXAMPLE 2

(a) *The preparation of bis thioacetyl diphenyllead*

Stoichiometric quantities of diphenyllead dichloride and lead (II) thioacetate were suspended in toluene, and the mixture refluxed for four hours. The reaction follows that above given, viz:

$$(C_6H_5)_2PbCl_2 + Pb(SCOCH_3)_2 \rightarrow$$
$$(C_6H_5)_2Pb(SCOCH_3)_2 + PbCl_2$$

the compound obtained, bis-thioacetyl diphenyllead having a cream color, was in 81% yield.

Other diphenyl, di-substituted lead sulfides were produced in a similar manner.

(b) *Preparation of thioacetyl triphenyllead*

This compound was prepared in exactly the same manner as set forth in Example 2(a) above, using triphenyllead chloride instead of the diphenyl compound. Its melting point is set forth in Table I, item 7, and its rodent repellent property is listed in Table III, item 4.

The other aliphatic compounds, numbers 4 and 14, Table I, were prepared following Example 1; the thiomethylcarbomethoxy compound, number 10, Table I, was prepared similarly to Example 2. Since the other compounds listed in Table I were prepared using stoichiometric quantities of the reactants, it is not necessary to restate the method in respect of each.

TABLE I

| | Formula | Compound | Melting Point °C. |
|---|---|---|---|
| 1 | $(C_6H_5)_3PbSCH_3$ | Thiomethyl triphenyllead | 108–109 |
| 2 | $(C_6H_5)_3PbSC_2H_5$ | Thioethyl triphenyllead | 67–68 |
| 3 | $(C_6H_5)_3PbSC_3H_7$ | Thiopropyl triphenyllead | 57–58 |
| 4 | $(C_6H_5)_3PbSC_4H_9$ | Thiobutyl triphenyllead | (1) |
| 5 | $(C_6H_5)_3PbSCH_2C_6H_5$ | Thiobenzyl triphenyllead | 82–83 |
| 6 | $(C_6H_5)_3PbSC_6H_5$ | Thiophenyl triphenyllead | 106–107 |
| 7 | $(C_6H_5)_3PbS\overset{O}{\overset{\|}{C}}CH_3$ | Thioacetyl triphenyllead | 92–93 |
| 8 | $(C_6H_5)_3PbS\overset{O}{\overset{\|}{C}}C_6H_5$ | Thiobenzoyl triphenyllead | 93–94 |
| 9 | $(C_6H_5)_3PbS$–naphthyl | Thionaphthyl triphenyllead | 73–75 |
| 10 | $(C_6H_5)_3PbSCH_2\overset{O}{\overset{\|}{C}}OCH_3$ | Thiomethylcarbomethoxy triphenyllead | 85 |
| 11 | $(C_6H_5)_3PbS$–benzthiazolyl | Thiobenzthiazolyl triphenyllead | 58 |
| 12 | $(C_6H_5)_2Pb(SC\text{-benzthiazolyl})_2$ | Dithiobenzthiazolyl diphenyllead | 152–153 |
| 13 | $(C_6H_5)_3PbS$–benzoxazolyl | Thiobenzoxazoyl triphenyllead | 65 |
| 14 | $(C_6H_5)_3PbS(CH_2)_9CH_3$ | Thiodecyl triphenyllead | (1) |
| 15 | $(C_6H_5)_2Pb(SCOCH_3)_2$ | Bisthioacetyl diphenyllead | 94–95 |

[1] Decomposed at b.p.

The foregoing compounds are presently undergoing tests in various fields. A number, including particularly thioacetyl triphenyllead, have shown activity against cell cultures at very low concentrations. Others, as for example those numbered 1 to 7 in Table I, have shown anti-androgenic activity in animal tests.

Various of our new compounds have proved to be highly useful as additives for lubricating oils, particularly for the purpose of improving their action in preventing friction and wear under boundary lubrication conditions.

Wear experiments were therefore run in the Shell Four Ball Wear Tester, which is widely used for measuring the wear prevention qualities of lubricants under boundary conditions. The device rotates a one-half inch metal ball under a specified load against three similar balls clamped together in an equilateral triangle. These balls are contained in a heated cup filled with the lubricant. The bulk temeperature of the lubricant is measured by a thermocouple inserted in a thermowell in the cup. Torque on the lower ball holder is a measure of the frictional resistance at the rubbing surfaces, and is continuously measured by means of a strain gauge and recorder. Further details of the Shell Tester may be had from Lub. Eng. 1, 35 (1945). The rubbing of the upper ball in the presence of the lubricant against the lower three produces circular concave scars on the lower balls. With no wear, the balls will have a minimum diameter (Hertz diameter) which is the result of elastic deformation of the balls, and is determined by the modulus of elasticity of the material and the load applied. After a wear run, the three scars are measured to 0.01 mm. under a microscope, and the average diameter is a measure of the wear, and the basis for computation of the unit pressure.

The pressure in the contact zone of balls in the 4-ball test decreases greatly during the course of the test, since the load remains constant, while the area (wear scar area) supporting it, increases. With a 15 kg. load on SAE 52–100 steel balls, the Hertz diameter is approximately 0.22 mm., which corresponds to a pressure of 230,000 lbs./in.$^2$. When the scar diameter reaches 0.5 mm., the pressure has dropped to 45,000 lbs./in.$^2$.

By maintaining the bulk lubricant temperature, rotational speed, and time, constant, the performance of lubricants on the basis of time required for the contact zone pressure to decrease to a given value at a specified temperature may be evaluated.

In the tests conducted to measure the lubricating value of the lubricating oil to which the new compounds were added, the time required for the pressure to decrease to 50,000 lbs./in.$^2$ was chosen as a convenient value to use in comparing relative performance.

Table II below is illustrative of results obtained by the use of our improved compounds. In carrying out the tests, white mineral oil was used as the base, and the quantity of additives used was 1% by weight based upon the lead content. To provide a basis of comparison, the same test was run upon the compound mixed zinc dialkyl phosphoro dithioate manufactured by Lubrisol Corporation under the trade name "Lubrisol 1060," and the results given in Table II. The concentration of Lubrisol 1060 was 4.04 weight percent.

TABLE II

| Compound | Concentration (Wt. percent cpd) | Change in Time (min.) to reach 50,000 lb./in.$^2$ | |
|---|---|---|---|
| | | At 50° C. | At 125° C. |
| Oil base without additive | | 18 | 11 |
| Lubrisol 1060 | 4.04 | 150 | 290 |
| Thioethyl triphenyllead | 2.41 | 3,000+ | 8 |
| Thiobutyl triphenyllead | 2.53 | 900+ | 8 |
| Thiobenzyl triphenyllead | 2.70 | *900+ | |
| Thiomethyl triphenyllead | 2.34 | 3,000+ | 3,000+ |
| Thiophenyl triphenyllead | 2.64 | 3,000+ | 19 |

*Not tested beyond 900 minutes.

Various of our new compounds were found to be effective as rodent repellents, and deterrents. In carrying out these tests, 25 white wheat seeds are treated with a 1% concentration of the test compound, and offered to each of 10 house mice for an overnight period of from 16 to 18 hours. If 13 or more seeds are uneaten, the animal is considered to be repelled. Those compounds which repel fewer than 80% of the mice, are not tested further. This test is patterned after those devised for testing the well-known repellent tetramethyl thiuran disulfid (TMTD).

The results of the screening tests with certain of our new compounds are listed below:

TABLE III

| | Formula | Compound | Repellency to house mice, No. repelled/No. tested |
|---|---|---|---|
| 1 | $(C_6H_5)_3PbSCOC_6H_5$ | Thiobenzoyl triphenyllead | 10/10 |
| 2 | $Ph_2Pb(SCH_2C_6H_5)_2$ | Diethiobenzyl diphenyllead | 10/10 |
| 3 | $Ph_3PbSC_3H_7$ | Thiopropyl triphenyllead | 10/10 |
| 4 | $Ph_3PbSCOCH_3$ | Thioacetyl triphenyllead | 8/10 |
| 5 | $Pb(SCH_3)_2$ | Lead methylmercaptide | 2/10 |
| 6 | $Pb(SC_3H_7)_2$ | Lead propylmercaptide | 2/10 |
| 7 | $Pb(SC_6H_5)_2$ | Lead phenylmercaptide | 1/10 |
| 8 | $Pb(Sc_2H_5)_2$ | Lead (II) ethylmercaptide | 0/10 |
| 9 | $Pb(SC_4H_9)_2$ | Lead-n-butylmercaptide | 0/10 |
| 10 | $Ph_4Pb$ | Tetraphenyllead | 0/10 |

Known compounds, 5 to 10 inclusive, are given for sake of comparison.

*Antifungal activity of organolead compounds*

A series of antifungal tests was carried out on various of our novel organolead-sulfur compounds, as indicated below. The test organisms were: *Botrytis allii*=B; *Penicillium niger*=P; *Aspergillus niger*=A; and *Rhizopus nigricans*=R.

The activity of the compound is that represented by the minimal concentration in parts per million causing complete inhibition of visible growth. Known compounds are given for the sake of comparison.

TABLE IV.—ANTIFUNGAL ACTIVITY OF ORGANOLEAD COMPOUNDS

| | Formula | Compound | B | P | A | R |
|---|---|---|---|---|---|---|
| 1 | $Ph_3PbSMe$ | Thiomethyl triphenyllead | 2 | 2 | 2 | 5 |
| 2 | $Ph_3PbSC_3H_7$ | Thiopropyl triphenyllead | 1 | 2 | 2 | 2 |
| 3 | $Ph_3PbSCH_2Ph$ | Thiobenzyl triphenyllead | 1 | 5 | 2 | 2 |
| 4 | $Ph_3PbSCOPh$ | Thiobenzoyl triphenyllead | 2 | 5 | 2 | 5 |
| 5 | $Ph_3PbPbPh_3$ | Hexaphenyldilead | >500 | >500 | >500 | >500 |
| 6 | $Ph_4Pb$ | Tetraphenyllead | >100 | >100 | >100 | >100 |
| 7 | $Ph_3PbMe$ | Triphenylmethyllead | 200 | >500 | >500 | >500 |
| 8 | $(Ph_3Pb)_2S$ | Triphenyllead disulfide | 100 | 100 | 50 | 100 |

We claim:

Organolead compounds selected from the group consisting of thiobenzthiazolyl triphenyllead, dithiobenzthiazolyl diphenyllead and thiobenzoxazoyl triphenyllead.

References Cited

UNITED STATES PATENTS

| | | | |
|---|---|---|---|
| 2,044,934 | 6/1936 | Calcott et al. | 167—22 |
| 2,789,104 | 4/1957 | Ramsden et al. | 260—45.75 |
| 3,073,853 | 1/1963 | Ballinger | 260—437 |
| 3,073,854 | 1/1963 | Ballinger | 260—437 |
| 3,081,325 | 3/1963 | Ballinger | 260—437 |
| 3,142,614 | 7/1964 | Ligett | 167—22 |

OTHER REFERENCES

Leeper et al., Chemical Reviews, vol. 54, No. 1, (1964), pp. 136 to 152.

TOBIAS E. LEVOW, *Primary Examiner.*

HELEN M. McCARTHY, *Examiner.*

E. C. BARTLETT, H. M. S. SNEED,

*Assistant Examiners.*